INVENTOR:
THOMAS BLESSINGER
BY Peter M. Boesen
ATTORNEY

United States Patent Office 3,515,478
Patented June 2, 1970

3,515,478
CHECK PHOTOGRAPHING APPARATUS
Thomas Blessinger, 34—19 29th St.,
Long Island City, N.Y. 11106
Filed Aug. 23, 1967, Ser. No. 662,604
Int. Cl. G03b *27/48, 27/50*
U.S. Cl. 355—48      4 Claims

ABSTRACT OF THE DISCLOSURE

Check photographing apparatus has a rotating drum containing circumferential grooves into which two feeders extend. The drum has a stub copy display area under a transparent window in its surface. One feeler activates a moving film camera on being contacted by a check to photograph each check being carried about by the rotating drum. The other feeler may be selectively activated to cause the camera to continue operating and photograph stub copy with each check.

BACKGROUND OF THE INVENTION

In banks checks are often photographed on microfilm and then printed out on conventional microfilm printing apparatus to provide the payee or the bank a permanent record. Often a large business firm payee will want to record additional information with the check so it is a great advantage to provide a stub to be photographed when desired with a given payee's checks. This invention provides means for a bank to photograph such stubs with a payee's checks.

SUMMARY OF THE INVENTION

A rotating drum has checks fed to it to move the checks in front of a moving film camera or the equivalent. A space is provided on the drum to receive copy to be photographed with the checks adjacent to the checks so that additional information may be recorded thereon. Each check on the drum moves a first feeler to activate the camera to photograph the check and the check then moves a second feeler to activate the camera to continue photographing the additional information or stub copy.

DESCRIPTION OF THE PREFERRED EMBODIMENT

Figure 1:
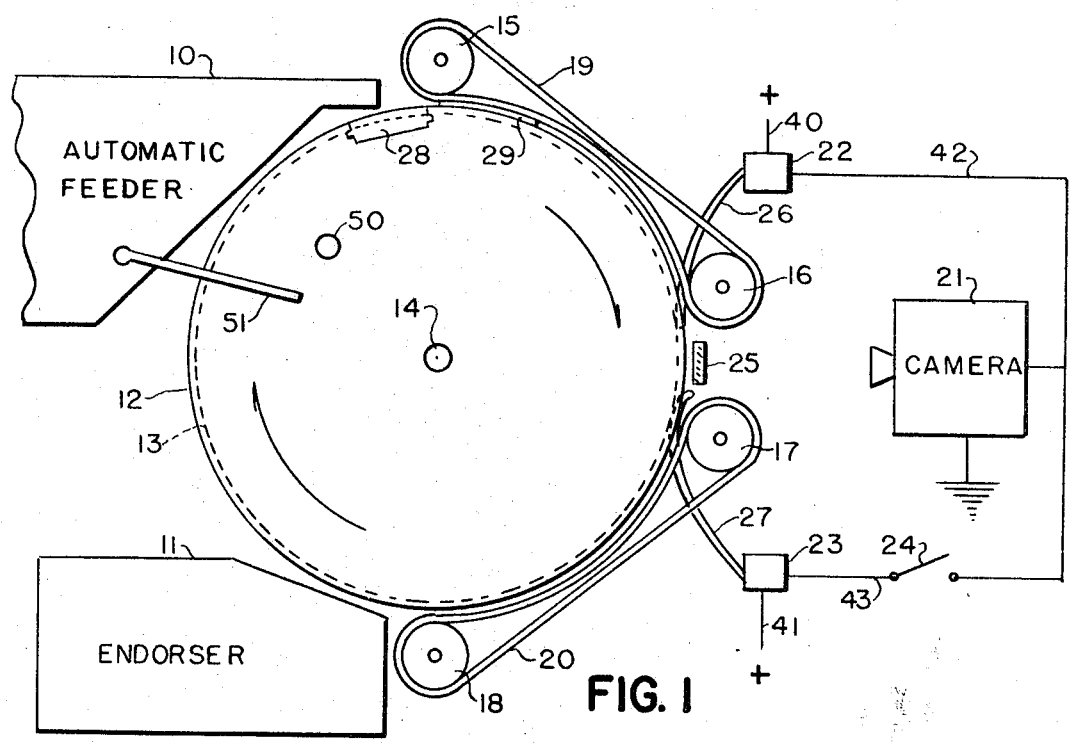
FIG. 1 is a side view of a drum and belts holding a check thereon and associated apparatus for photographing the check and selectively a stub with a moving film slit camera.
Figure 4:
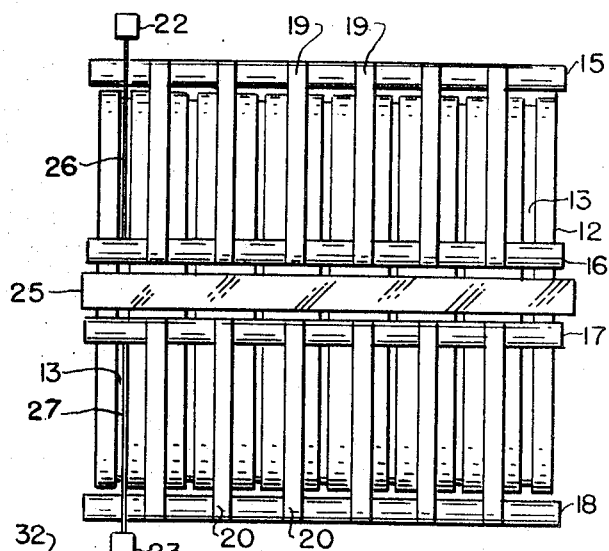
FIG. 4 is a side view of the drum and belts of FIG. 1 taken from the camera side of the drum.

Referring to FIGS. 1 and 4 checks to be photographed are placed in the automatic feeder 10 or in any equivalent device. Drum 12 is rotated at low speed about axle 14 by any suitable drive means. Check feeder 10 is activated to feed a check 29 by cam 50 striking lever 51. Cam 50 is placed so that check 29 is deposited adjacent to the stub copy window 28. As each check 29 is fed onto drum 12, it is held against drum 12 by the upper belts 19 which pass about the rollers 15 and 16. The drum 12 and the upper belts 19 pass each check 29 behind the narrow horizontal slit window 25 during which time each check is secured by the lower belts 20 which pass about the rollers 17 and 18. The drum 12 and belts 20 deliver the checks 29 to an endorser 11 or other desired equipment.

A microswitch 22 has an arm or feeler 26 which extends into one of a set of circumferential grooves 13 formed in drum 12. As check 29 contacts and lifts arm 26, current passes through lead 40, switch 22, and lead 42 to the moving film camera 21 to photograph the portions of the check passing behind window 25. In any conventional manner, camera 21 is synchronized with the speed of drum 12. When arm 26 is no longer contacted by a check 29, the camera 21 is deactivated.

Figures 2, 3:
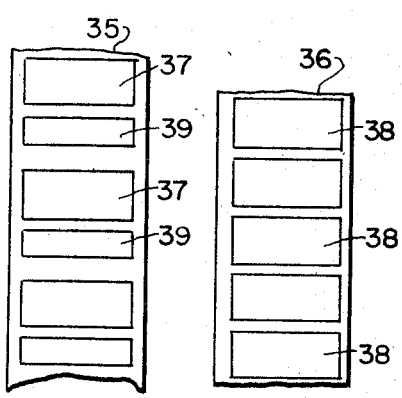
FIG. 2 is a fragment of a strip of paper on which a sequence of microfilmed checks have been printed without stub copy.
FIG. 3 is a fragment of a strip of paper on which a sequence of microfilmed checks have been printed with stub copy following each check.

As shown in FIG. 2, the film thus taken by camera 21 may be used to print on a strip of paper 36 the sequence of checks 38.

Referring further to FIG. 1, a second arm or feeler 27 extends into a circumferential groove 13 and is lifted by a check 29 while the check 29 is still contacting feeler 26. Thus if switch 24 is closed, current will flow from lead 41, through switch 23, through lead 43, and through switch 24 to continue activating camera 21 to photograph the stub copy window 28 on drum 12. The switches 22 and 23 are connected in series so that the operation of camera 21 is continuous to photograph each check 29 and the adjacent copy window 28.

Figure 5:
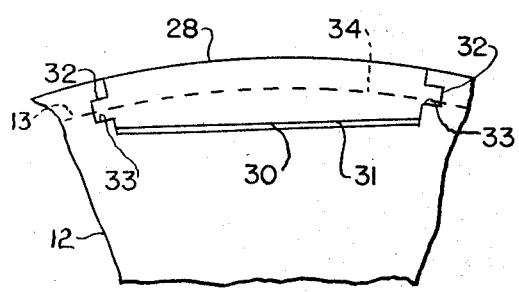
FIG. 5 is a fragment of the side of the drum of this invention shown in an end view to show details of construction of the stub copy window.

As shown in FIG. 5, drum 12 has the transparent stub copy window 28 slid laterally into place in the periphery of the drum 12. Window 28 is secured by two projections 32 which slide in and lock in corresponding grooves 33. The bottom surface 30 of window 28 is flat and has copy 31 fixed thereto. The copy 31 may be printed on paper or on plastic sheets as desired. The circumferential grooves 13 are continued as the grooves 34 which correspond and cross window 28.

As shown in FIG. 3, each check of a sequence of checks 37 printed on a strip of paper 35 is followed by the printing of a stub or stub copy 39. If it is not desired to photograph the stub copy, switch 24 need only be opened.

The apparatus of this invention is superior as no timers, elaborate circuitry, or other failure prone devices are required. If desired, the positions of the feelers or arms 26 and 27 may be shifted on drum 12 so that a stub is photographed before rather than after a check. Cam 50 would then be repositioned so that a check 29 would be fed directly after window 28. To change copy 31 behind window 28 and to allow easy access to window 28 while in the drum 12, the automatic feeder may be hinged to be swung away from drum 12.

While this invention has been shown and described in the best form known, it will nevertheless be understood that this is purely exemplary and that modifications may be made without departing from the spirit and scope of the invention except as it may be more limited in the appended claims wherein:

What is claimed is:

1. Apparatus for photographing checks comprising, in combination, a rotating drum, check feeding means, a transparent stub window in the surface of said drum, said window having stub copy and a flat bottom surface receiving said stub copy thereunder to display stub copy on said drum, means on said drum activating said check feeding means to deposit a check adjacent to said window on said drum, means holding said checks on the surface of said drum, a moving film camera synchronized with said drum, a first feeler activating said camera to photograph said checks when said first feeler is contacted by a check on the surface of said drum, and a second feeler activating said camera to photograph said window when said second feeler is contacted by a check on the surface of said drum, said second feeler being contacted by a check while said first feeler is still contacted by the same check so that said camera continuously photographs both a check and said window displaying stub copy.

2. The combination according to claim 1 wherein said drum has at least one circumferential groove formed therein in said drum and in said transparent stub window, said first and second feelers extending into said at least one circumferential groove over which a check held on the surface of said drum extends.

3. The combination according to claim 2 wherein said means holding said checks on said drum comprises upper and lower sets of rollers, and upper and lower sets of belts extending about each set of rollers, said belts having one run adjacent to the surface of said drum and said camera photographing said checks and said transparent stub window between said upper and lower sets of belts.

4. The combination according to claim 3 with the addition of a current source to activate said camera, a first switch, a second switch, and a third stub cutoff switch, said first feeler activating said first switch, said second feeler activating said second switch, said current source being connected to said camera through said first and second switches in parallel, said third switch being connected in series with said second switch between said current source and said camera.

References Cited
UNITED STATES PATENTS

| | | | |
|---|---|---|---|
| 1,957,889 | 5/1934 | Hopkins et al. | 355—64 |
| 2,627,203 | 2/1953 | Hessert | 355—48 |

NORTON ANSHER, Primary Examiner

RICHARD A. WINTERCORN, Assistant Examiner

U.S. Cl. X.R.

346—107; 355—50, 64